United States Patent
Hepburn et al.

(10) Patent No.: US 9,514,294 B1
(45) Date of Patent: Dec. 6, 2016

(54) ACCESSING A COMPUTING RESOURCE

(71) Applicant: International Business Machines Corporation, Armonk, NY (US)

(72) Inventors: Brent A. Hepburn, Brighton, MA (US); Juan G. Lara, Dublin (IE); Mark A. McGloin, Dublin (IE); Olgierd S. Pieczul, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/939,219

(22) Filed: Nov. 12, 2015

(51) Int. Cl.
*G06F 21/31* (2013.01)
*H04L 29/06* (2006.01)
*G06F 21/62* (2013.01)
*H04L 9/32* (2006.01)

(52) U.S. Cl.
CPC ......... *G06F 21/316* (2013.01); *G06F 21/6218* (2013.01); *H04L 9/3226* (2013.01); *H04L 9/3236* (2013.01); *H04L 63/0281* (2013.01); *H04L 63/083* (2013.01)

(58) Field of Classification Search
CPC . G06F 21/316; H04L 63/083; H04L 9/3226; H04L 9/3236
See application file for complete search history.

(56) References Cited

U.S. PATENT DOCUMENTS

| | | |
|---|---|---|
| 5,699,514 A | 12/1997 | Durinovic-Johri et al. |
| 7,992,008 B2 | 8/2011 | Ashok et al. |
| 8,302,187 B1 | 10/2012 | Gupta et al. |
| 8,312,540 B1* | 11/2012 | Kahn .................. G06F 21/552 713/183 |
| 8,601,109 B2 | 12/2013 | Johannsen |
| 9,088,560 B1* | 7/2015 | Newstadt ................ H04L 63/08 |
| 9,213,812 B1* | 12/2015 | Windell ................. G06F 21/31 |
| 9,294,456 B1* | 3/2016 | Timmermans ........ H04L 63/083 |
| 9,305,151 B1* | 4/2016 | Dotan .................... G06F 21/31 |
| 9,349,014 B1* | 5/2016 | Hubing ................ G06F 21/577 |
| 2003/0101359 A1 | 5/2003 | Aschen et al. |
| 2004/0255155 A1* | 12/2004 | Stading .................. G06F 21/46 726/25 |
| 2005/0015614 A1* | 1/2005 | Gilfix .................... G06F 21/31 726/7 |

(Continued)

FOREIGN PATENT DOCUMENTS

CN 200710176839 4/2012

OTHER PUBLICATIONS

Kirushnaamoni, R.; "Defenses to curb Online Password Guessing Attacks", International Conference on Information Communication and Embedded Systems, IEEE, Feb. 21-22, 2013, pp. 317-322.*

(Continued)

*Primary Examiner* — Victor Lesniewski
(74) *Attorney, Agent, or Firm* — Schmeiser, Olsen & Watts, LLP; Isaac Gooshaw

(57) ABSTRACT

A method, and an associated computer system and computer program product. A login request is received from a user, to log into a computing resource, wherein the login request includes a password and a user identifier of the user. The received password is compared with a stored password to determine whether to grant access to the computing resource. Responsive to determining that the received password does not match the stored password, an authenticity of the login request is determined, based on one or more characteristics of the user and/or one or more checks performed against the received password. A score is calculated based on the determined authenticity of the login request. The login request is denied. Based on the calculated score, it is decided whether to lock the user and deny the user further access to the computing resource.

3 Claims, 8 Drawing Sheets

(56) References Cited

U.S. PATENT DOCUMENTS

| | | | |
|---|---|---|---|
| 2006/0041756 A1* | 2/2006 | Ashok | G06F 21/31 713/183 |
| 2007/0234062 A1* | 10/2007 | Friedline | G06F 21/31 713/183 |
| 2008/0313721 A1* | 12/2008 | Corella | G06F 21/31 726/6 |
| 2009/0019514 A1* | 1/2009 | Hazlewood | H04L 63/20 726/1 |
| 2009/0253408 A1* | 10/2009 | Fitzgerald | G06F 21/316 455/411 |
| 2009/0260065 A1* | 10/2009 | Kailash | H04L 63/083 726/5 |
| 2009/0260078 A1* | 10/2009 | Nakazawa | G06F 21/31 726/19 |
| 2010/0162385 A1 | 6/2010 | Wildensteiner | |
| 2011/0016534 A1* | 1/2011 | Jakobsson | G06F 21/316 726/28 |
| 2011/0087890 A1* | 4/2011 | Munsil | G06F 21/31 713/184 |
| 2013/0198832 A1* | 8/2013 | Draluk | G06F 21/31 726/16 |
| 2013/0298200 A1 | 11/2013 | Cai | |
| 2014/0165169 A1* | 6/2014 | Buck | G06F 21/31 726/7 |
| 2014/0189829 A1* | 7/2014 | McLachlan | G06Q 20/4014 726/6 |
| 2014/0208386 A1* | 7/2014 | Sama | H04L 63/08 726/4 |
| 2015/0067472 A1 | 3/2015 | Chen | |
| 2015/0324559 A1* | 11/2015 | Boss | H04L 63/20 726/1 |
| 2016/0180068 A1* | 6/2016 | Das | H04L 63/0861 726/7 |

OTHER PUBLICATIONS

Alsaleh, Mansour; Mannan, Mohammad; van Oorschot, P.C.; "Revisiting Defenses against Large-Scale Online Password Guessing Attacks", IEEE Transactions on Dependable and Secure Computing, vol. 9, Issue 1, May 12, 2011, pp. 128-141.*

Olejnik et al., Why Johnny Can't Browse in Peace: On the Uniqueness of Web Browsing History Patterns, Conference papers 5th Workshop on Hot Topics in Privacy Enhancing Technologies (HotPETs 2012) Jul. 2012, Vigo, Spain, 16 pages.

* cited by examiner

ACCESSING A COMPUTING RESOURCE

TECHNICAL FIELD

The present invention relates generally to accessing a computing resource, and more specifically, to authenticating a user requesting access to a computing resource.

BACKGROUND

Many computing resources (e.g. a computer system) require a user to authenticate by entering a password before gaining access to a particular resource.

SUMMARY

The present invention provides a method, and an associated computer system and computer program product. One or more processors of a computer system receive a login request, from a user, to log into a computing resource, wherein the login request includes a password and a user identifier of the user. The one or more processors compare the received password with a stored password to determine whether to grant access to the computing resource. Responsive to determining that the received password does not match the stored password, the one or more processors determine an authenticity of the login request based on one or more characteristics of the user and/or one or more checks performed against the received password. The one or more processors calculate a score based on the determined authenticity of the login request. The one or more processors deny the login request. Based on the calculated score, the one or more processors decide whether to lock the user and deny the user further access to the computing resource.

BRIEF DESCRIPTION OF THE DRAWINGS

Embodiments of the present invention will be described, by way of example only, with reference to the following drawings.

DETAILED DESCRIPTION

Figure 1:
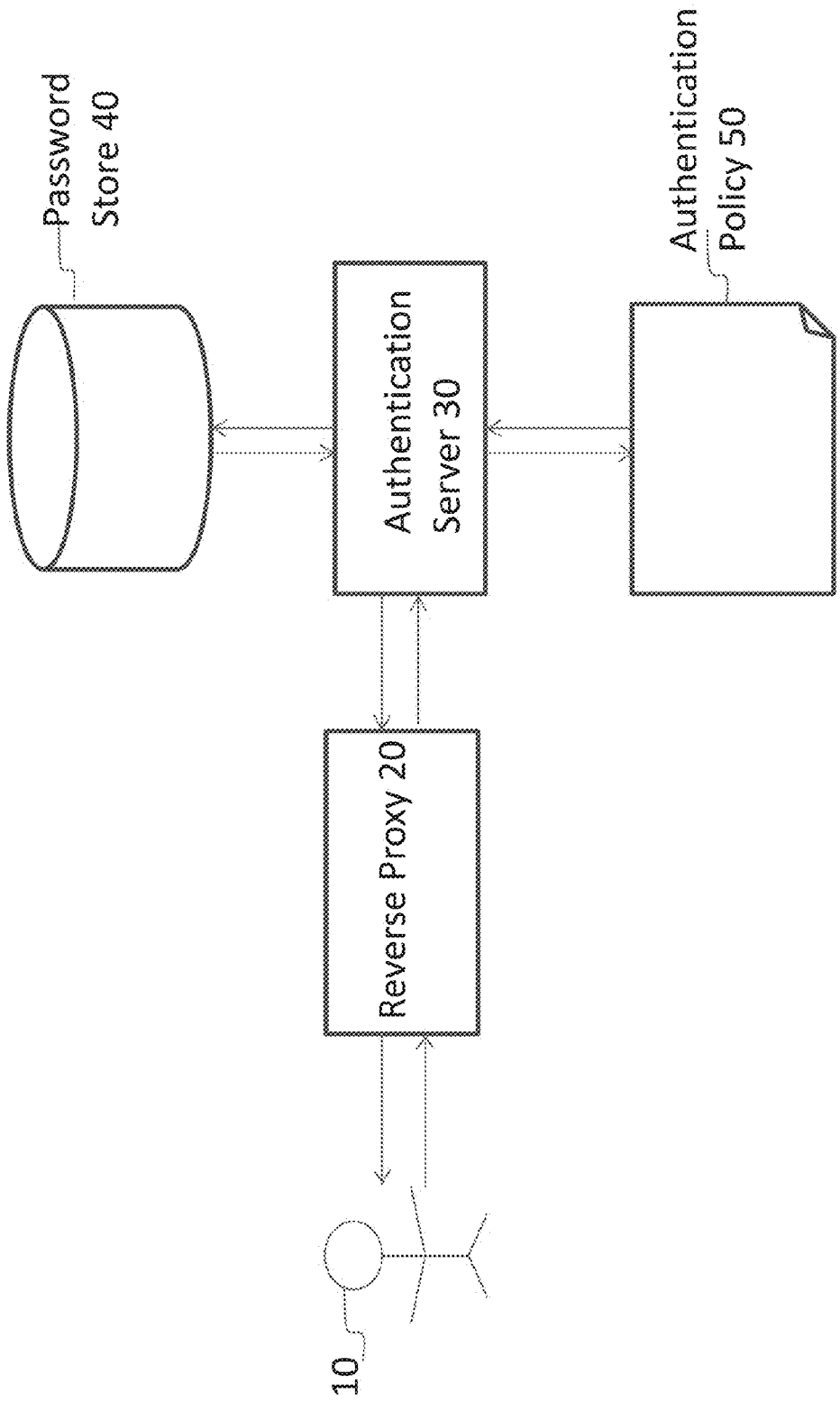
FIG. 1 shows a high level overview of embodiments of the present invention.

It should be understood that the Figures are merely schematic and are not drawn to scale. It should also be understood that the same reference numerals are used throughout the Figures to indicate the same or similar parts.

A user is typically allowed a specified number of failed attempts at entering a correct password before the user's account is locked, which represents an issue for legitimate users who may have forgotten the legitimate users' password. Alternatively a malicious attacker may submit multiple invalid logins in order to purposely lock a user out.

In the context of the present application, where embodiments of the present invention constitute a method, it should be understood that such a method is a process for execution by a computer; i.e., the process is a computer-implementable method. The various steps of the method therefore reflect various parts of a computer program; e.g., various parts of one or more algorithms embodied within the computer program.

There is provided, in accordance with embodiments of the present invention, a solution which attempts to prevent account lockout of authorized (legitimate) users after a specified number of failed attempts at gaining access to a resource. A scoring system is used to determine a likelihood that an attempt is from an attacker and to weight each failed attempt accordingly. An account may have a certain number of credits associated with the account, and the system will deduct one or more credits in response to receipt of an invalid login attempt, wherein the login attempt is highly likely to have come from a non-authorized entity. In response to an account having no more associated credits, a user(s) is locked out.

FIG. 1 provides a high level overview of embodiments of the present invention. A user 10 attempts to login to a resource by providing a set of user credentials which may include, inter alia, a user name (identifier) and a user password. The resource may, for example, be a website, an application or a computer system (none of which are shown in FIG. 1). The resource may have the resource's own built-in or associated authentication mechanism (e.g., security software) or may forward the login request to an authentication server 30. The login request to the authentication server 30 may go via a reverse proxy 20. In another embodiment, the reverse proxy 20 may be omitted entirely. Authentication server 30 then makes a determination as to whether the user's login request should be allowed. Such a determination of whether the user's login request should be allowed is made by accessing password store 40, which stores passwords associated with user accounts for which the authentication server 30 is responsible. The passwords associated with user accounts may be stored as a hash digest of the password rather than plaintext, as hash digests created via cryptographic hash algorithms provide an extra layer of security should the authentication server become compromised. If the submitted password is found not to match the stored password for the requested user account, then the requesting user 10 is not necessarily locked out. Instead, authentication server 30 checks authentication policy 50 to make a determination as to whether the requesting user 10 is likely to be a legitimate user (who has forgotten the user's password or made a minor mistake) versus an attacker. It will be appreciated that an attacker may, for example, be a human, but may equally be an automated bot submitting hundreds of such requests.

The login attempt is weighted accordingly, and a failed attempt is reported back via reverse proxy 20 to user 10. The authentication server 30 weights the failed attempt based on authentication policy 50 and makes a decision whether or not to lock the user account. The authentication server may or may not report a locked account back to the user 10.

Figure 2:
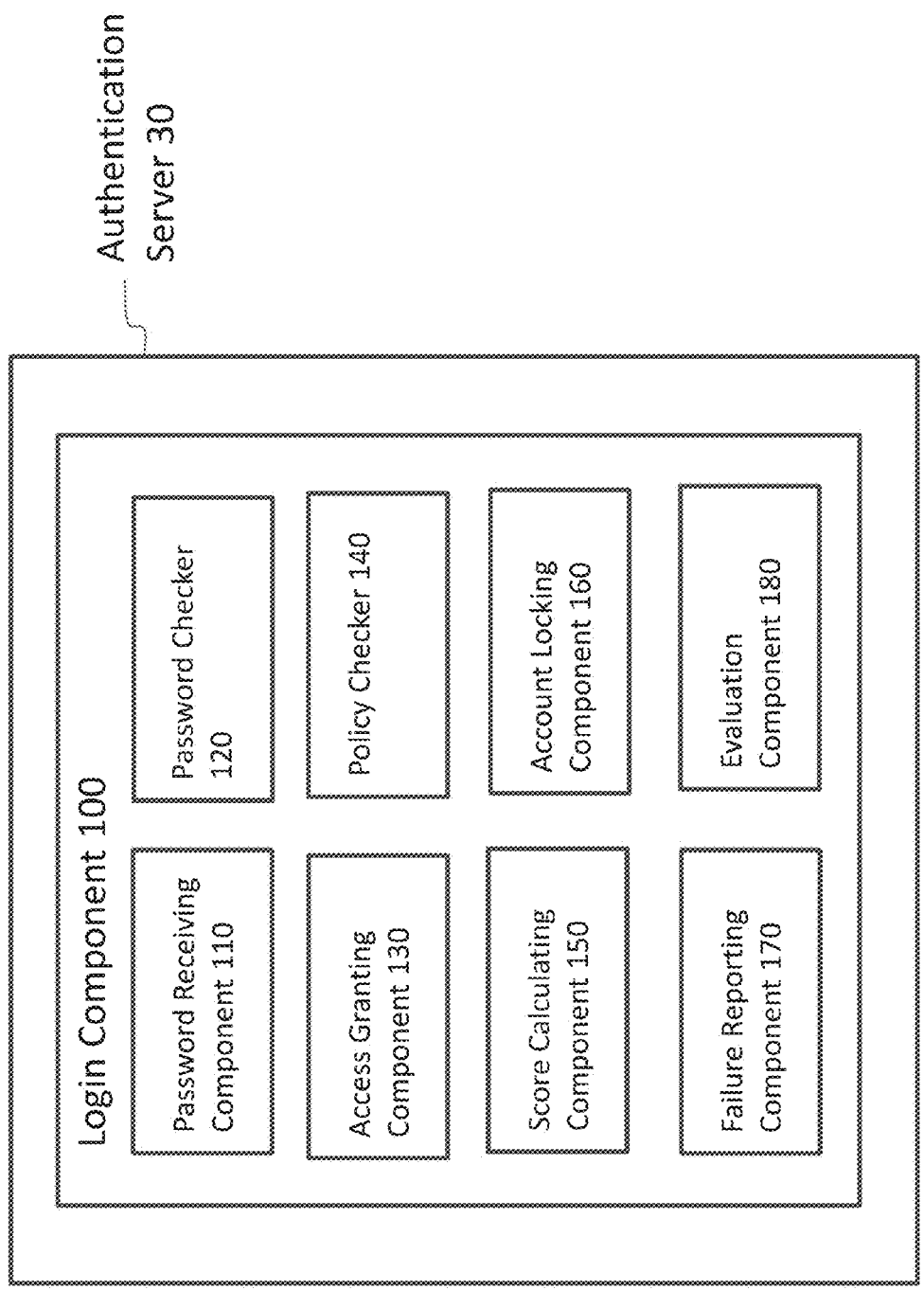
FIG. 2 is an exemplary component diagram showing components of an authentication server, in accordance with embodiments of the present invention.
Figure 3A:
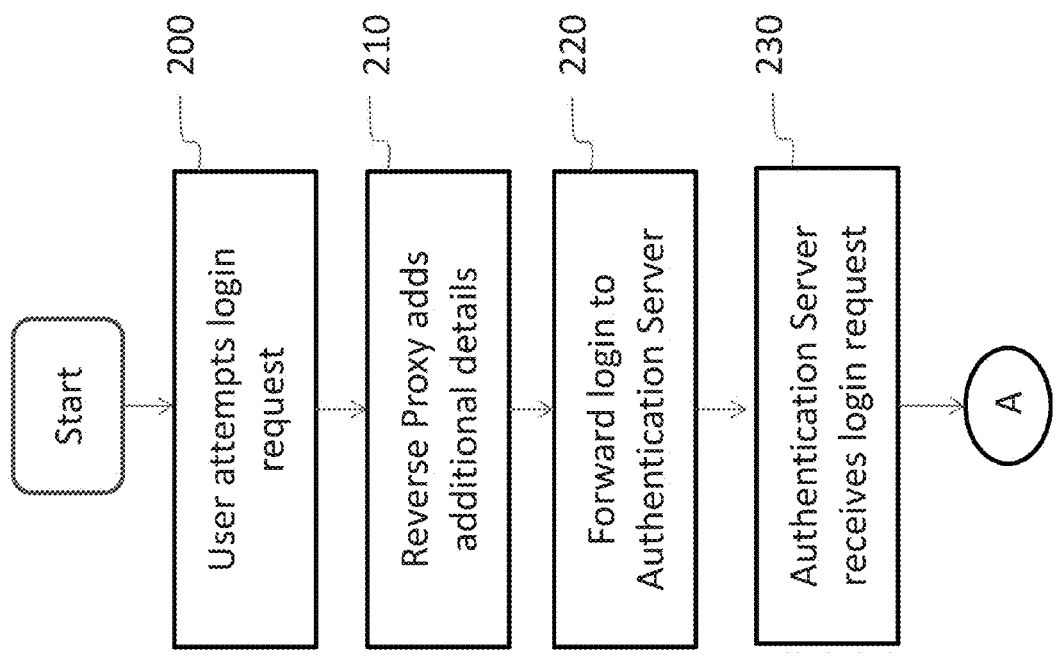
FIGS. 3a, 3b and 3c is a flow chart showing a method of embodiments of the present invention.

FIG. 2 is an exemplary component diagram showing the components of the authentication server 30, in accordance with embodiments of the present invention. FIG. 2 should be read in conjunction with FIGS. 3a, 3b and 3c, which show a flow chart of embodiments of methods of the present invention.

Figure 3B:
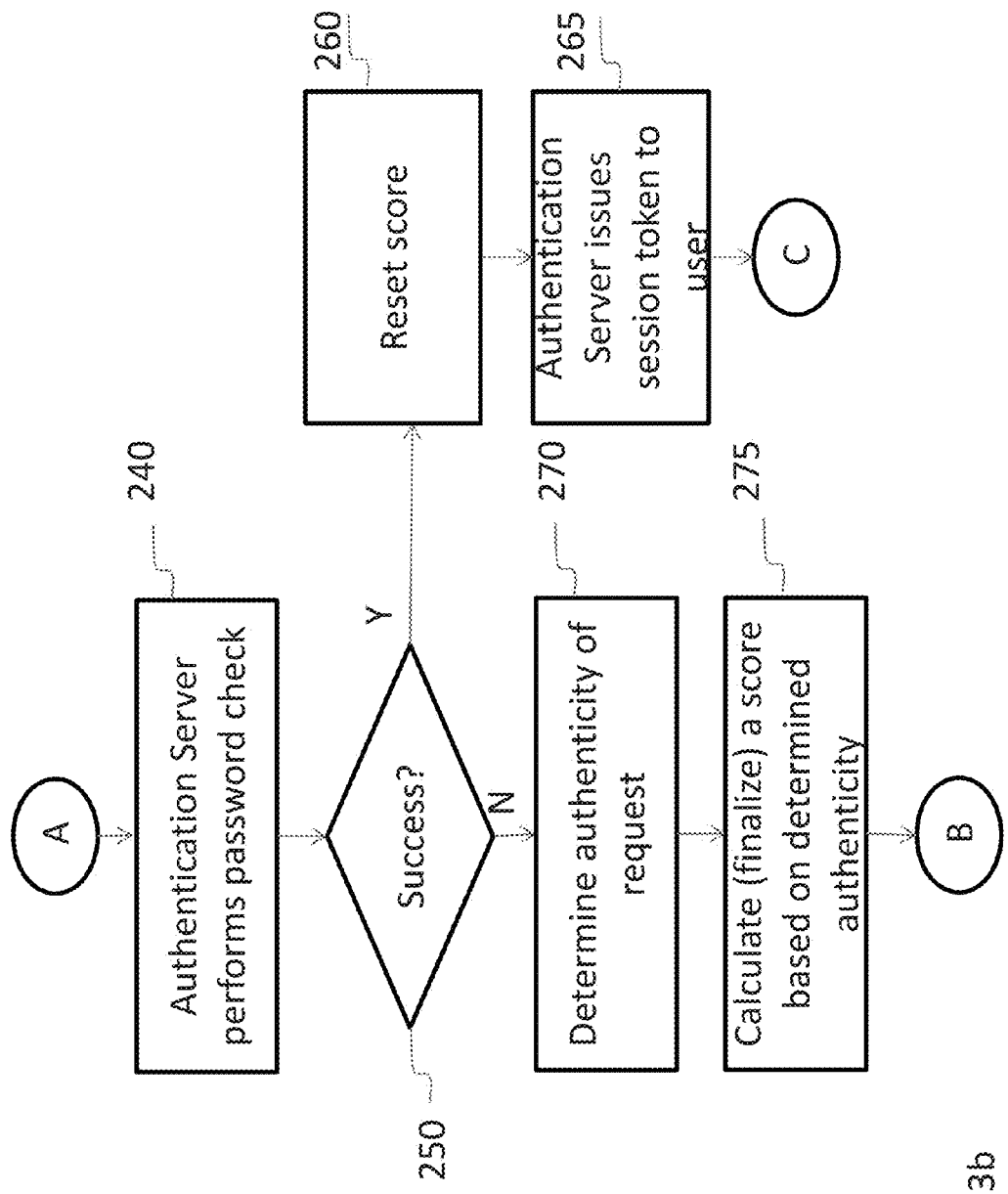

In FIG. 3, a user 10 attempts a login at step 200 via a login request that may be transmitted to the reverse proxy 20 at step 210, if reverse proxy 20 is present. In step 210, the reverse proxy 20 may add additional detail to the login request such as, inter alia, a source IP address or location information. The reverse proxy 20 is able to query the requester or a separate service/database for such additional information. The reverse proxy 20 then forwards the login request to authentication server 30 at step 220. Authentication server 30 comprises a login component 100. A password receiving component 110 (within login component 100) receives the user's login request at step 230 after which processing proceeds to step 240 in FIG. 3b, with password checker component 120 performing a password check using password store 40. As discussed above, valid passwords (i.e., those passwords which grant access to a computing resource) may be stored as hash values. Hash values generated using a cryptographic hash algorithm cannot be reversed and therefore add an additional level of security. A received password is run (by the password checker component 120) through a cryptographic hash function to create a hashed version of the received password, and password checker 120 compares the hashed version of the received password with a stored (hashed) version of the password.

If the submitted (received) password is correct (i.e. matches the stored version of the password), then score calculating component 150 resets a score associated with the user's account (steps 250, 260) and access granting component 130 issues a session token to the user 10, which grants the user 10 access to the user's requested resource (step 265). Processing then moves FIG. 3C and ends.

Embodiments of the present invention includes case(s) in which the check fails at step 250, thereby indicating that the user 10 submitted an incorrect password. Policy checker 140 checks the authenticity of the request at step 270 using authentication policy 50, and score calculating component 150 calculates (finalizes) a score based on a likely authenticity of the request (step 275). Therefore, a specified number of successive failed login attempts does not necessarily cause a user's account to be locked. Each such failed login attempt is assessed and weighted based on a likelihood that the failed login attempt has come from either an attacker or a legitimate user. Such an assessment affects an overall score associated with the account for which access is being requested. This score is calculated by score calculating component 150. Step 270, along with the calculation of a score at step 275 by component 150, will be discussed in more detail later with reference to FIGS. 4a and 4b.

Figure 3C:
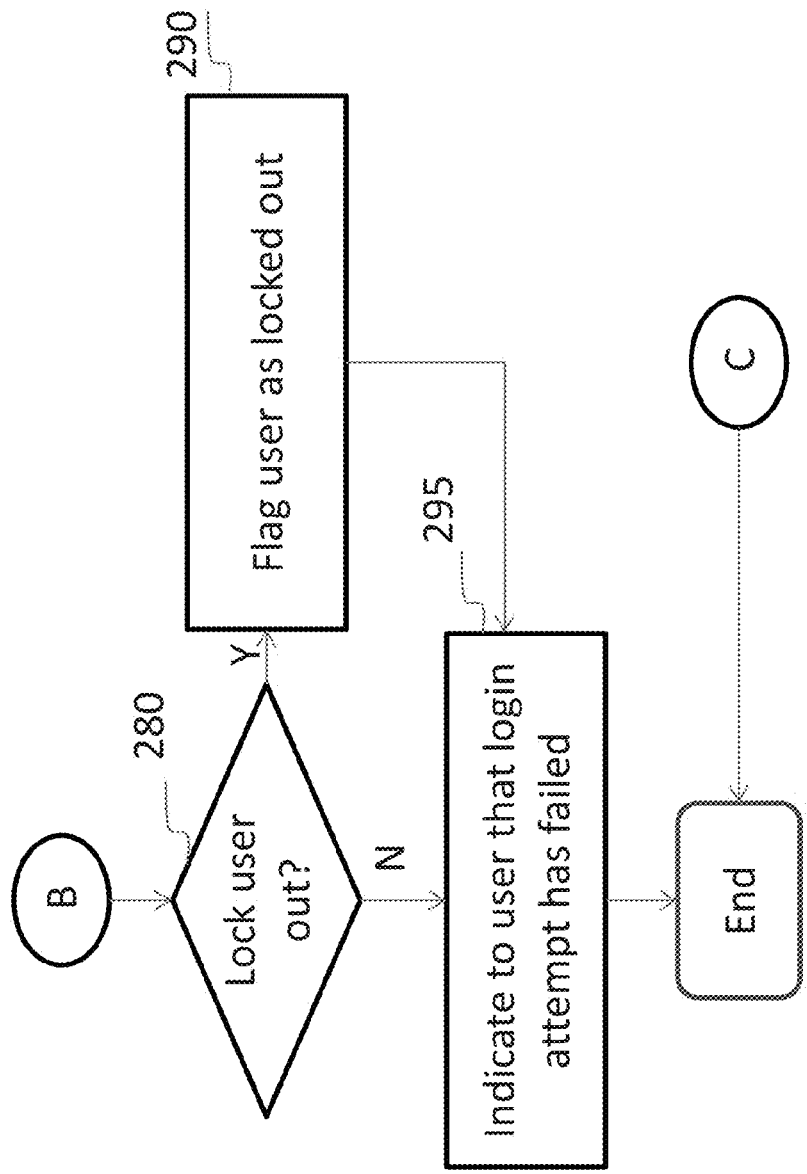

After step 275 is executed, processing moves to step 280 in FIG. 3C. Based on how likely it is that the login request has come from a legitimate user (rather than from an attacker) and after the score is calculated (finalized) at step 275, a determination is made by account locking component 160 at step 280 as to whether to lock the requesting user 10 out of the requesting user's account. If a positive determination is made at step 280, then the user's account is flagged (at step 290) as locked by component 160. In one embodiment, this lockout of the user 10 is only reported to the user 10 in response to a subsequent attempt to login. Processing moves to step 295. In an alternative embodiment, however, the user 10 is informed that the user 10 is now locked out of the user's account.

If it is determined at step 280 that the user 10 should not be locked out of the user's account, then failure reporting component 170 informs the user 10 at step 295 that the user's login attempt has failed. This information (i.e., the user's login attempt has failed) is transmitted from the authentication server 30 via the reverse proxy 20 to the user 10, as is shown in FIG. 1.

While not shown in the flowchart of FIG. 3, it will be appreciated that a first step in response to receipt of a login attempt may be to check that the user account is not locked.

Authentication policy 50 includes a set of modifiers (or input parameters) which may be used (applied) at step 270 to determine an authenticity of the login request and which have impact on the score calculated.

Some exemplary modifiers which may be included in authentication policy 50 are:

1) Password matches password policy (length, character set, case sensitivity of password);
2) Previous password (based on a password history, looking for automated patterns);
3) Passwords that are words based on a dictionary attack or user personal information;
4) Passwords based on company name or an abbreviation for a company name or public information;
5) Location where the login request originated, time of the login request, and/or time zone;
6) Wi-Fi access point (e.g. connected or mobile network);
7) Application used to request access (e.g., Browser—type, version, plugins);
8) Platform;
9) Platform specific parameters (e.g., screen size, resolution, language, etc.); and
10) Speed of submission attempts.

The modifiers may fall into two overlapping groups:

1. Those modifiers that identify activity typical to a legitimate user (such as using an old password or a user authenticating from the same (usual) location or with the same (usual) browser characteristics); and
2. Those modifiers that identify activity typical to an attacker (such as using a password based on a dictionary attack).

Many of the modifiers can be classified as those that differentiate legitimate users from attackers based on some characteristic of the user rather than the password being used to authenticate.

The modifiers are used to calculate an overall score for each invalid (failed) login attempt. Each such attempt is assessed and weighted based on a likelihood that the attempt has come from either an attacker or a legitimate user. Such an assessment then affects an overall score associated with the account for which access is being requested.

By way of example only, after each successful login, the score calculating component 150 sets 100 credits against the user account for which access is being requested. For every failed attempt to login, score calculating component 150 deducts a number of credits, and account locking component 160 locks the account when credits=0 (or another suitable threshold is reached). The number of credits deducted for each failed login attempt varies depending on whether the modifiers indicate that the attempt is likely to be from a legitimate user or from an attacker. So if policy checker 140 observes that the user is coming from an untrusted new location or that the password is based on a dictionary attack, which is a very typical type of attack for password guessing, the number of credits that score calculating component 150 deducts would be a relatively higher number (e.g., 20 credits).

If the password is a same password as an old password, or the user comes from a trusted location, then the number of credits that score calculating component 150 deducts would be a relatively smaller number (e.g., 10 credits). If a large number of failed attempts happened in a short period of time with the same password and from trusted locations, then score calculating component 150 could reduce the number of credits for each of those failed attempts even further.

Score calculating component 150 may use a lookup table to determine the weight to apply to a particular failed attempt and consequently the number of credits to deduct.

Figure 4A:
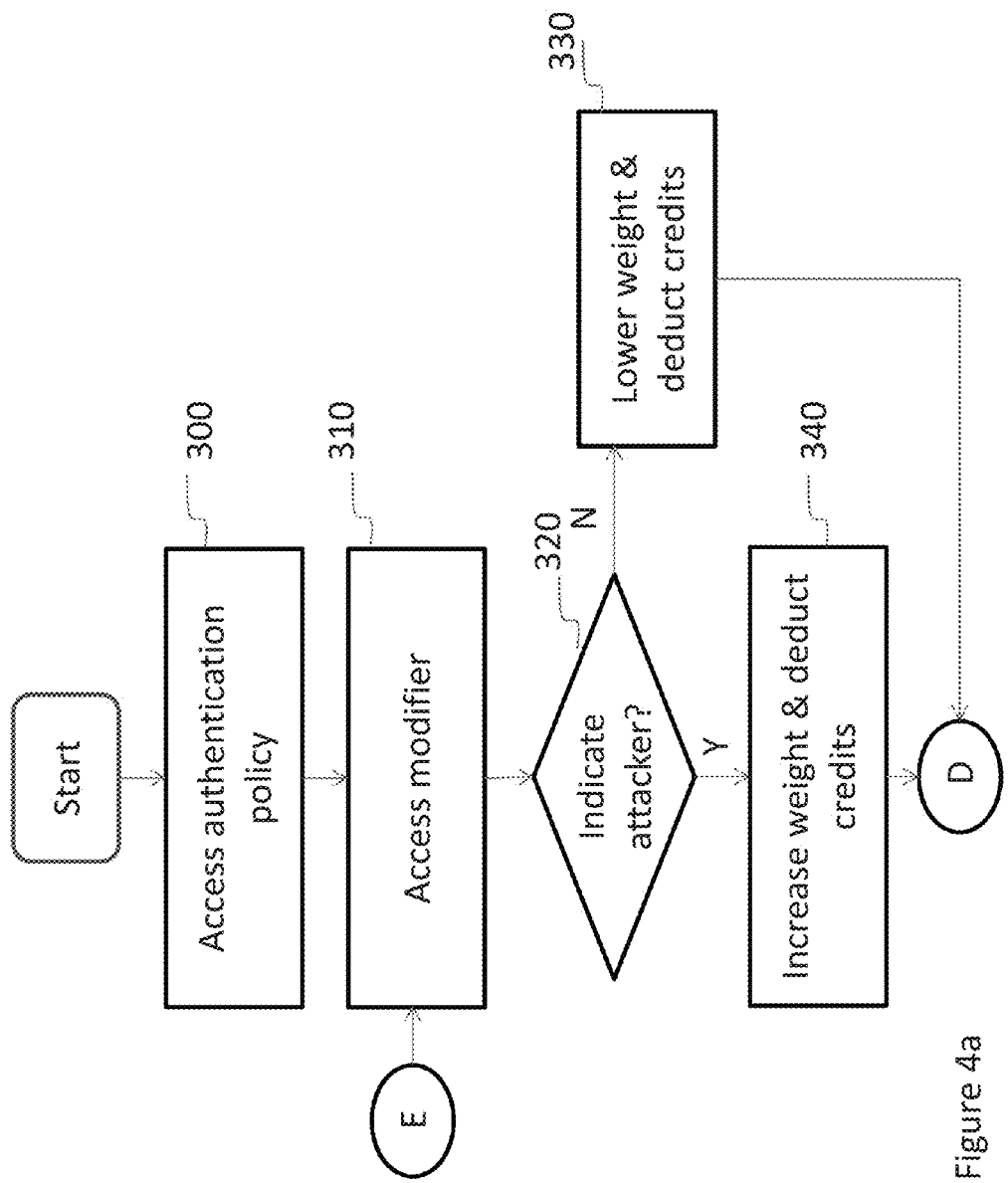
FIGS. 4a and 4b depict a flow chart showing, in accordance with embodiments of the present invention, how a determination is made as to an authenticity of a user.

The process for determining the authenticity of the user, in accordance with embodiments of the present invention, is discussed in more detail with reference to FIGS. 4a and 4b.

Processing in accordance with embodiments of the present invention is performed by evaluation component 180, score calculating component 150 and policy checker 140 (see FIG. 2). Evaluation component 180 has overall control but passes control to policy checker 140 and score calculating component 150 as appropriate. The passing of control between the various components is not shown in FIGS. 4a and 4b. In one embodiment, components 140 and 150 form part of evaluation component 180. In another embodiment, score calculating component 150 forms part of policy checker 140.

At step 300, evaluation component 180 directs policy checker 140 to access authentication policy 50. As previously indicated, the authentication policy 50 includes a number of modifiers. Policy checker 140 accesses the first of these modifiers at step 310. Policy checker 140 then determines at step 320 whether the password attempt, taking the modifier into account, indicates that the password attempt is likely to be from an attacker. Control is then returned to evaluation component 180, which passes control to score-calculating component 150. If there is a negative determination made at step 320 (i.e., the password attempt is likely to be a legitimate user), then score calculating component 150 lowers a weight associated with the password attempt and deducts a relatively smaller number of credits from the total number of credits associated with the user account at step 330. On the other hand, if it is determined in step 320 that the password attempt is likely to be from an attacker, then score calculating component 150 increases the weight and deducts a relatively larger number of credits from the total number of credits associated with the user account at step 340. Control is then returned to evaluation component 180.

Figure 4B:
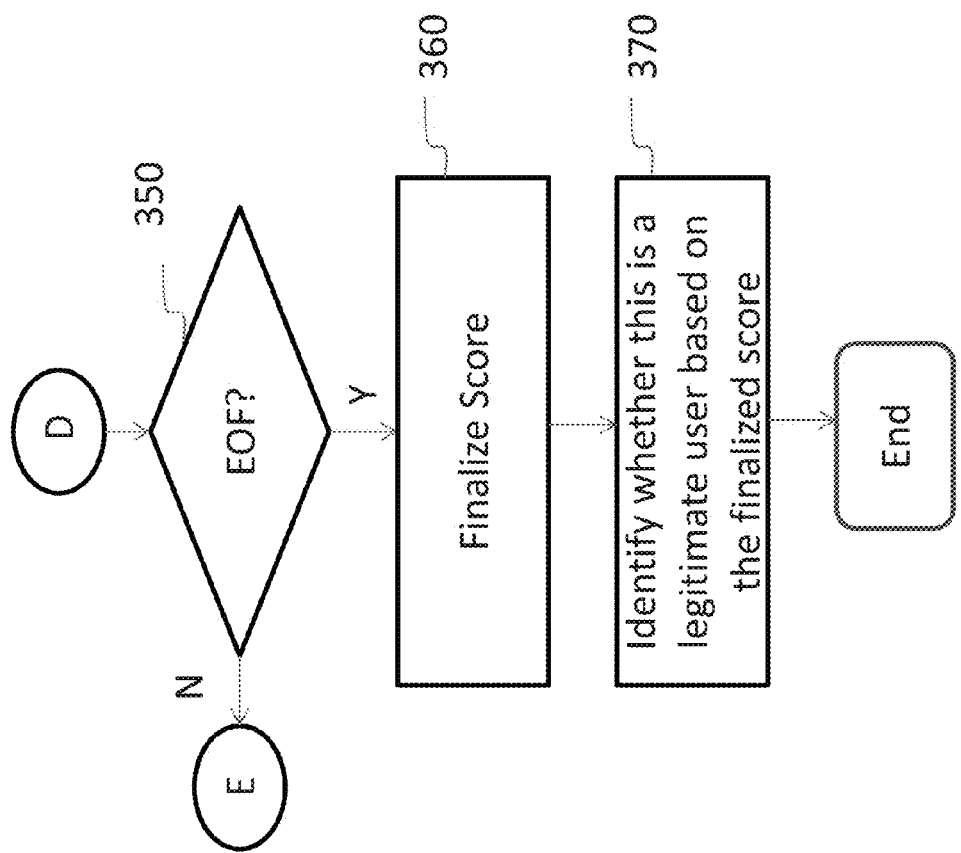

After step 340 is executed, processing proceeds to step 350 in FIG. 4b. Evaluation component 180 passes control to policy checker 140 which determines whether the 'End Of File' (EOF) has been reached. In other words, policy checker 140 determines whether the last of the modifiers has been taken into account when considering whether the password attempt is likely to be from a legitimate user or from an attacker. If there are one or more additional modifiers that the login attempt needs to be evaluated against, then processing proceeds back to step 310 in FIG. 4a. Policy checker 140 then evaluates the next modifier in the list and raises or lowers the weight as necessary and deducts an appropriate number of credits from the total number of credits associated with the account for which access is being requested.

If the last modifier has been evaluated, then control is returned to evaluation component 180 which then requests that score calculating component 150 finalizes the score associated with the invalid login attempt, which is done at step 360. Based on the final score, evaluation component 180 determines (at step 370) whether the attempt is likely to be from a legitimate user or from an attacker. Processing then ends.

As indicated above, the score is associated with a user's login account and is carried over between invalid login attempts. The score may continue decreasing until 0 (or until another appropriate threshold) is reached or until a successful login attempt is received and the score is reset. Score calculating component 15 may reset the score back to the full amount (e.g. 100) or to an amount that is above the threshold.

The processing performed for some of the modifiers with respect to step 320 is discussed in further detail below.

Password Policy

It is determined whether the password is in accordance with the password policy (not shown in FIG. 1). The password policy may set rules as to length, character set, case sensitivity etc. If the submitted password does at least comply (or mostly comply) with a specified password policy, then at step 330, the weight is lowered by a relatively smaller amount, since the login attempt is likely to be from a legitimate user.

Passwords Based on a Known Dictionary or Containing User Personal Information

The password is checked against a list of known dictionary of bad passwords such as "12345678", "password" or passwords that can be easily guessed (such as user login). Such passwords may indicate an attack and thus have more weight.

The provided password is also checked for publicly available personal information, which would add weight to the likelihood that the login attempt is from an attacker as opposed to a legitimate user.

Location from which the Request Originates/Wi-Fi Access

The location from which the user 10 connects is determined. The location could be the IP address, the network or a location identified by any location service technology. Whether the Wi-Fi access comes from a connected or mobile network is also determined. New or unknown configurations add more weight.

Machine Configuration

The authentication server 30 may store a fingerprint of the client machine configuration (browser type, version, plugins, platform, screen resolution, language etc.) from which the user 10 typically logs into the user's account. The authentication server 30 will then check how the client machine compares to the machine from which this login request originates. If the authentication server 30 determines that the client machine configuration is a new configuration, then relatively more weight would be added to the likelihood that this attempt is from an attacker.

There are many papers and descriptions of how an individual client machine can be identified with a fingerprint, which will not be described herein in any further detail.

Speed of Submission

Submissions done in rapid succession may indicate an automated attack against a user's account. A typical user pauses or types slowly between attempts to review the user's password submission. An automated brute force attack would repeat password attempts quickly.

Previous Password Attempts

An action of the user 10 using a previous password lowers the weight. A threshold may be set to indicate a password for an acceptable time period; e.g., any password valid within the last 3 months.

In one embodiment, using the same password a specified number of times lowers the weight. In an example, after changing the user's password, the user 10 gets immediately revoked, because there are multiple clients trying to connect with the old password. However, from the attack point of view, this is only a single password test just repeated a specified number of times.

In one embodiment, password submissions are compared with previous password attempts to look for a pattern in the previous password attempts. A typical user would not rotate through a common pattern of strings (ex. password, password1, password2). Looking for patterns in previous password attempts (i.e., previously received invalid passwords) could help identify a brute force attack by an automated system in order to guess a user's password. Such a pattern of password attempts would therefore add weight to the likelihood that the previous password attempts are from an attacker.

If there are several matches (e.g., a request coming from a new location with a password based on a dictionary of known passwords and from a new platform), in one embodiment, a specific configuration pertaining to the several matches would be blocked, allowing the legitimate user to continue logging in from the user's regular configuration settings.

As mentioned above, embodiments of the present invention are particularly concerned with systems which store user passwords as hash values, which is done to protect the integrity of user passwords should the authentication server 30 ever be compromised. Storing passwords in clear text is often not a sensible option. Other systems encrypt user passwords, but if the decryption key is discovered, then a resource becomes vulnerable. Hashed user passwords, on the other hand, are seen as more secure as long as a cryptographically secure hash algorithm generates them. Cryptographic hash functions make the password storage more secure, but also bring additional challenges. Because the hashes are cryptographically secure, the output of a hash cannot easily be compared for differences, which is different from storing encrypted versions of passwords, since an encrypted password can be decrypted.

Password modifiers 1, 3 and 4, listed above are still valid in a system which stores hashed passwords, as the rules can be checked against a non-hashed version of the password. The checking of the rules may be done upfront before a comparison is made between a hashed version of the received password and the hashed version of the password protecting the user account. The results of any checks are then stored for use in determining the authenticity of a user should the user's password submission be found to be invalid (i.e., not to match). Of course, such checks could be done only in response to discovering that the two passwords do not match, but this could mean (in some cases) temporarily storing a plaintext version of the received password which could compromise security.

With respect to password modifier 2, previous password hashes can be retained, which is a better approach than retaining non-hashed versions that could compromise security by enabling an attacker to guess the correct password from previous incorrect submissions. Hashes of a certain number of previous invalid password submissions could also be retained for checking against. Retaining plaintext versions of a predetermined number of invalid attempts (so that patterns can be identified) could be implemented but may compromise security (i.e., enable an attacker to guess the correct password) and thus may not be a sensible option.

Figure 5:
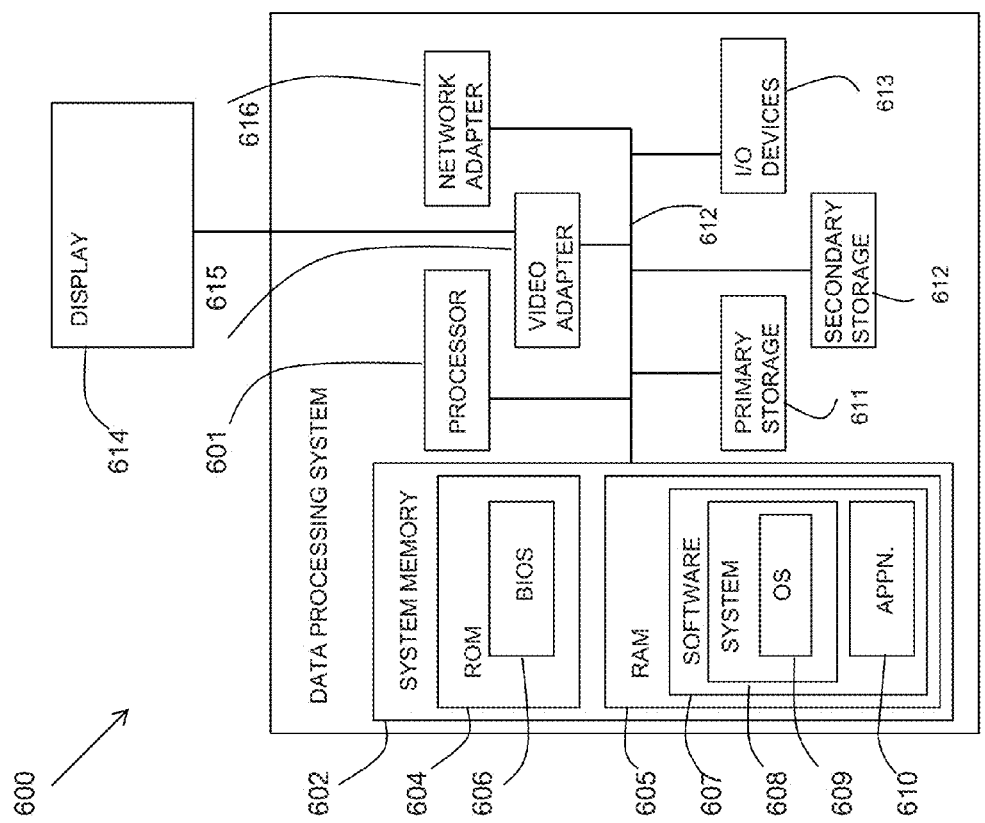
FIG. 5 is a block diagram of an exemplary computer system in which embodiments of the present invention may be implemented.

Referring to FIG. 5, an exemplary system for implementing embodiments of the invention includes a data processing system 600 (which is an example of authentication system 30) suitable for storing and/or executing program code including at least one processor 601 coupled directly or indirectly to memory elements through a bus system 612. The memory elements may include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. Software 607 may be stored in RAM 605 including system software 608 such as operating system software 609. Software applications 610 may also be stored in RAM 605 and may include login component 100.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The system 600 may operate in a networked environment using logical connections to one or more remote computers via a network adapter 616.

Input/output devices 613 may be coupled to the system 600 either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 612 via an interface, such as video adapter 615.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method, said method comprising:
   in response to a successful login by a user, setting, by one or more processors of a computer system, a score equal to a positive number of credits to a user account of the user;
   after said setting the score, receiving, by the one or more processors, a login request, from the user, to log into a computing resource, said login request including a password and a user identifier of the user;
   comparing, by the one or more processors, the received password with a stored password to determine whether to grant the user access to the computing resource;
   responsive to determining that the received password does not match the stored password, determining, by the one or more processors, a total number of credits to deduct from the score, wherein said determining the total number of credits to deduct from the score comprises determining that the total number of credits to deduct from the score includes a first number of credits to deduct in response to a determination that the login request is a failed attempt by the user to login;

deducting, by the one or more processors, the total number of credits from the score, which results in the score being an overall score;

denying, by the one or more processors, the login request; and based on comparing the overall score with a threshold score, deciding, by the one or more processors, whether to lock the user and deny the user further access to the computing resource, wherein said determining the total number of credits to deduct from the score includes initializing the total number of credits to the first number of credits, and for each modifier of a plurality of modifiers: ascertaining whether, taking a determined value of the modifier into account, that the login request is more likely or not more likely to be from an attacker than from the user, wherein if said ascertaining ascertains that the login request is more likely or not more likely to be from the attacker than from the user then adding a second number of credits or a third number of credits, respectively, to the total number of credits to deduct from the score, wherein the second number of credits exceeds the third number of credits, and wherein the second and third number of credits are specific to the modifier, and wherein the plurality of modifiers are selected from the group consisting of: whether or not the password is from a trusted new location, whether or not at least a specified number of failed login attempts occurred with the password from trusted locations, whether or not the password complies with a specified character length, character set, and case sensitivity, whether or not the password is a dictionary of passwords that can be easily guessed, whether or not the password includes publicly available personal information, whether or not a location from which the user connects provides the user with Wi-Fi access in accordance with a new or unknown configuration, whether or not a client machine configuration from which the user logs into the user account is a new configuration, whether or not the password has been previously submitted multiple times in succession, whether or not the user has used the password within a specified acceptable time period, whether or not the password has been a specified number of times, whether or not the password matches a pattern found in previous password attempts, and combinations thereof.

2. A computer program product, comprising one or more computer readable hardware storage devices having computer readable program code stored therein, said program code containing instructions executable by one or more processors of a computer system to implement a method, said method comprising:

in response to a successful login by a user, setting, by the one or more processors, a score equal to a positive number of credits to a user account of the user;

after said setting the score, receiving, by the one or more processors, a login request, from the user, to log into a computing resource, said login request including a password and a user identifier of the user;

comparing, by the one or more processors, the received password with a stored password to determine whether to grant the user access to the computing resource;

responsive to determining that the received password does not match the stored password, determining, by the one or more processors, a total number of credits to deduct from the score, wherein said determining the total number of credits to deduct from the score comprises determining that the total number of credits to deduct from the score includes a first number of credits to deduct in response to a determination that the login request is a failed attempt by the user to login;

deducting, by the one or more processors, the total number of credits from the score, which results in the score being an overall score;

denying, by the one or more processors, the login request; and based on comparing the overall score with a threshold score, deciding, by the one or more processors, whether to lock the user and deny the user further access to the computing resource, wherein said determining the total number of credits to deduct from the score includes initializing the total number of credits to the first number of credits, and for each modifier of a plurality of modifiers: ascertaining whether, taking a determined value of the modifier into account, that the login request is more likely or not more likely to be from an attacker than from the user, wherein if said ascertaining ascertains that the login request is more likely or not more likely to be from the attacker than from the user then adding a second number of credits or a third number of credits, respectively, to the total number of credits to deduct from the score, wherein the second number of credits exceeds the third number of credits, and wherein the second and third number of credits are specific to the modifier, and wherein the plurality of modifiers are selected from the group consisting of: whether or not the password is from a trusted new location, whether or not at least a specified number of failed login attempts occurred with the password from trusted locations, whether or not the password complies with a specified character length, character set, and case sensitivity, whether or not the password is a dictionary of passwords that can be easily guessed, whether or not the password includes publicly available personal information, whether or not a location from which the user connects provides the user with Wi-Fi access in accordance with a new or unknown configuration, whether or not a client machine configuration from which the user logs into the user account is a new configuration, whether or not the password has been previously submitted multiple times in succession, whether or not the user has used the password within a specified acceptable time period, whether or not the password has been a specified number of times, whether or not the password matches a pattern found in previous password attempts, and combinations thereof.

3. A computer system, comprising one or more processors, one or more memories, and one or more computer readable hardware storage devices, said one or more hardware storage device containing program code executable by the one or more processors via the one or more memories to implement a method, said method comprising:

in response to a successful login by a user, setting, by the one or more processors, a score equal to a positive number of credits to a user account of the user;

after said setting the score, receiving, by the one or more processors, a login request, from the user, to log into a computing resource, said login request including a password and a user identifier of the user;

comparing, by the one or more processors, the received password with a stored password to determine whether to grant the user access to the computing resource;

responsive to determining that the received password does not match the stored password, determining, by the one or more processors, a total number of credits to deduct from the score, wherein said determining the total number of credits to deduct from the score comprises determining that the total number of credits to deduct from the score includes a first number of credits to deduct in response to a determination that the login request is a failed attempt by the user to login;

deducting, by the one or more processors, the total number of credits from the score, which results in the score being an overall score;

denying, by the one or more processors, the login request; and based on comparing the overall score with a threshold score, deciding, by the one or more processors, whether to lock the user and deny the user further access to the computing resource, wherein said determining the total number of credits to deduct from the score includes initializing the total number of credits to the first number of credits, and for each modifier of a plurality of modifiers: ascertaining whether, taking a determined value of the modifier into account, that the login request is more likely or not more likely to be from an attacker than from the user, wherein if said ascertaining ascertains that the login request is more likely or not more likely to be from the attacker than from the user then adding a second number of credits or a third number of credits, respectively, to the total number of credits to deduct from the score, wherein the second number of credits exceeds the third number of credits, and wherein the second and third number of credits are specific to the modifier, and wherein the plurality of modifiers are selected from the group consisting of: whether or not the password is from a trusted new location, whether or not at least a specified number of failed login attempts occurred with the password from trusted locations, whether or not the password complies with a specified character length, character set, and case sensitivity, whether or not the password is a dictionary of passwords that can be easily guessed, whether or not the password includes publicly available personal information, whether or not a location from which the user connects provides the user with Wi-Fi access in accordance with a new or unknown configuration, whether or not a client machine configuration from which the user logs into the user account is a new configuration, whether or not the password has been previously submitted multiple times in succession, whether or not the user has used the password within a specified acceptable time period, whether or not the password has been a specified number of times, whether or not the password matches a pattern found in previous password attempts, and combinations thereof.

* * * * *